May 19, 1942.  W. F. KRENZKE  2,283,269
POWER LAWN MOWER EQUIPMENT FOR DIRECT CONNECTION TO TRACTORS
Filed Nov. 25, 1940  3 Sheets-Sheet 1

INVENTOR
WILLIAM F. KRENZKE
BY A.S.Knoh
ATTORNEY

May 19, 1942.  W. F. KRENZKE  2,283,269
POWER LAWN MOWER EQUIPMENT FOR DIRECT CONNECTION TO TRACTORS
Filed Nov. 25, 1940  3 Sheets-Sheet 3

INVENTOR
WILLIAM F. KRENZKE
BY A. Strotz
ATTORNEY

Patented May 19, 1942

2,283,269

UNITED STATES PATENT OFFICE 2,283,269

POWER LAWN MOWER EQUIPMENT FOR DIRECT CONNECTION TO TRACTORS

William F. Krenzke, Racine, Wis., assignor to Jacobsen Manufacturing Company, Racine, Wis., a company of Wisconsin Application November 25, 1940, Serial No. 366,998

10 Claims. (Cl. 56—7)

The present invention relates to lawn mower attachments for conventional tractors and has for its object providing a number of mower units which are pulled and powered by the tractor.

An object of the present invention is to provide units with pulling, lifting and power connections which can be easily attached to the tractor or easily detached.

A further object of my invention is to provide a center unit and end mower units and means whereby they may be lifted easily from the ground and whereby the outer ends of the end units may be raised considerable higher than the rest of the units in order to reduce the overall width for passing through gates or narrow doors.

A still further object of the present invention is to provide power and draft connections for the units which permit them to ride freely over the surface of the ground and will not interfere in any way with the guiding and turning movements of the tractor.

To these and other useful ends, my invention consists of parts, combinations of parts, or their equivalents, and mode of operation, as hereinafter set forth and claimed and shown in the accompanying drawings in which:

Figure 1:
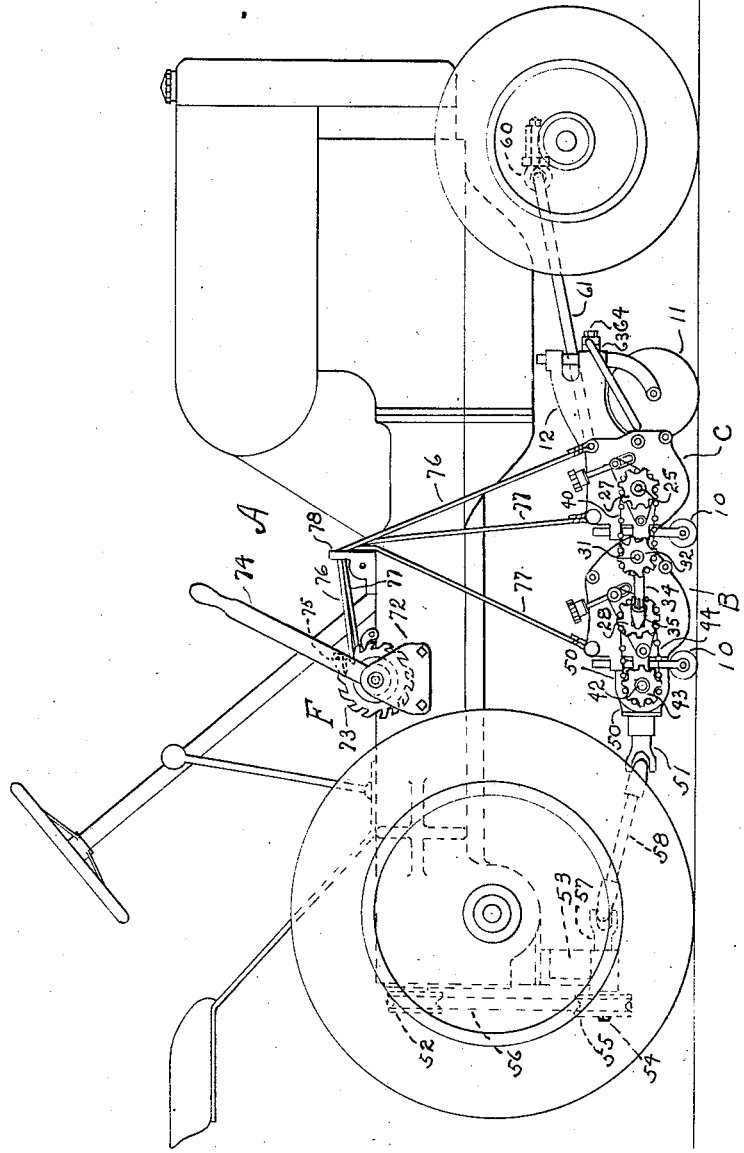
Fig. 1 is a side elevational view of a well known tractor equipped with my invention.

As thus illustrated, reference character A designates the tractor in its entirety, B designates in its entirety the center mower unit; C and D designate in their entireties the right and left hand mower units. The power transmitting device between the tractor and units is designated in its entirety by reference character E and the lifting device in its entirety is designated by reference character F.

In the present invention, I have provided means by which power is taken from the standard power take-off of the tractor. Thus the operator of the tractor will have complete control over the power to the mower units as is provided when implements are pulled and powered by the tractor.

Figure 2:
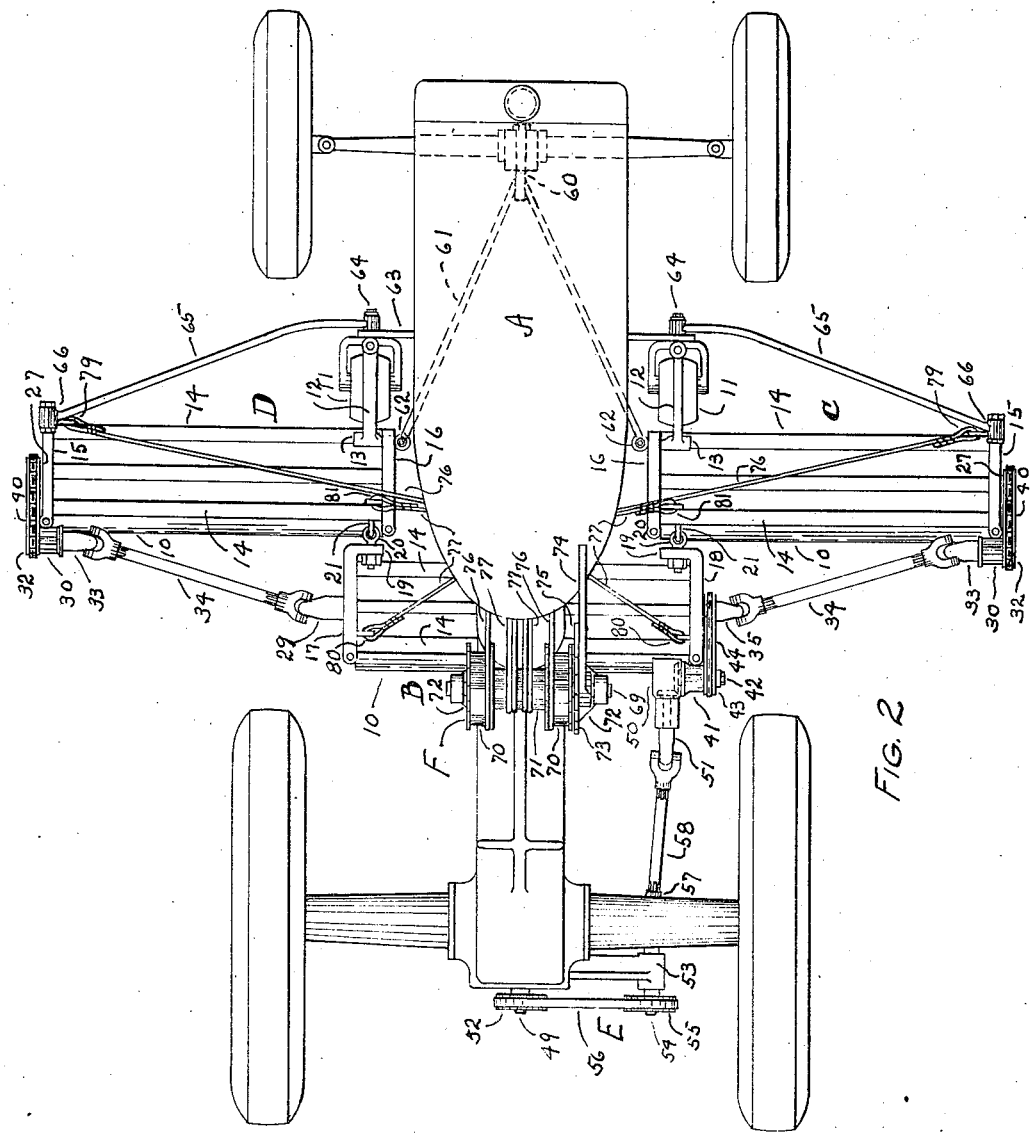
Fig. 2 is a top view of the tractor and mower attachments illustrated in Figure 1.

Units B, C and D basically are similar and are positioned under the tractor, as shown in Figures 1 and 2, units C and D being in transverse alignment and unit B being preferably positioned in rear of these units.

Each of units C and D is provided with rear carrying means 10, preferably rollers, the front of these units being carried on wheels 11—11. These wheels are castered on brackets 12—12, the brackets being attached to the front inner corners of the frames as at 13. The frames comprise spaced parallel bars 14—14, the outer ends of these bars on units C and D being secured together by frame brackets 15—15 and their inner ends being secured together by means of frame brackets 16—16.

Unit B comprises spaced parallel frame bars 14—14 being secured together at their ends by means of brackets 17 and 18. Unit B is also provided with a rear carrying roller 10.

Brackets 17 and 18 have inwardly turned extensions 19 to which I-bolts 20 are secured. U-bolts 21 are embraced by I-bolts 20 and are secured to rear frame bars 14 of units C and D; thus forming a universal joint between the inner rear corners of members C and D and the front outer corners of member B. Therefore the front end of member B will be carried by the carrying rollers 10 on members C and D.

It will be seen that the mower units are supported at their rears by rollers and that the front end of unit B is supported by the rollers on units C and D and that the front of units C and D are supported by wheels 11. Therefore it may be said that each unit is free to move over uneven ground and will be held at a predetermined height from the ground for determining the length of stubble and that the rear corners of units C and D will be held in spaced relation by unit B.

The usual rotary cutters on members C and D are mounted on shafts 25—25 (one not shown) and the rotary cutter on unit B is mounted on shaft 26 (not shown). Shafts 25 at their outer ends protrude through their bearings and have mounted thereon sprockets 27—27. Both ends of shaft 26 on unit B protrude through their bearings on brackets 17 and 18, one end having a sprocket 28 and a universal coupling 35 (see Figure 2) and the other end having a universal coupling 29 secured thereto (see Figure 2). Brackets 15 on units C and D carry bearings 30—30 (see Figure 2) in which are rotatably mounted shafts 31—31 (one not shown).

On the outer ends of shafts 31, I mount sprockets 32—32 and on the inner ends of these shafts I mount universal joints 33—33. Splined shafts 34—34 form operating connections between universal joints 29 and 35 and 33.

Chains 40—40 form an operating connection between sprockets 27 and 32. Thus it will be seen that the rotary cutter on units C and D will be driven by the rotary cutter shaft on unit B.

Member 18 on unit B carries a bearing bracket 41 having rotatably mounted therein a shaft 42. A sprocket 43 is mounted on the outer end of shaft 42 and a chain 44 forms an operating connection between sprockets 28 and 43.

I provide a housing 50 on the inner end of bearing bracket 41 which is adapted to inclose a bevel gear on the inner end of shaft 42 (see dotted lines). A universal joint 51 is mounted on the rear end of a shaft which is rotatably mounted in the rear extension of housing 50 carrying on its forward end a bevel pinion which meshes with the bevel gear on shaft 42.

Figure 4:
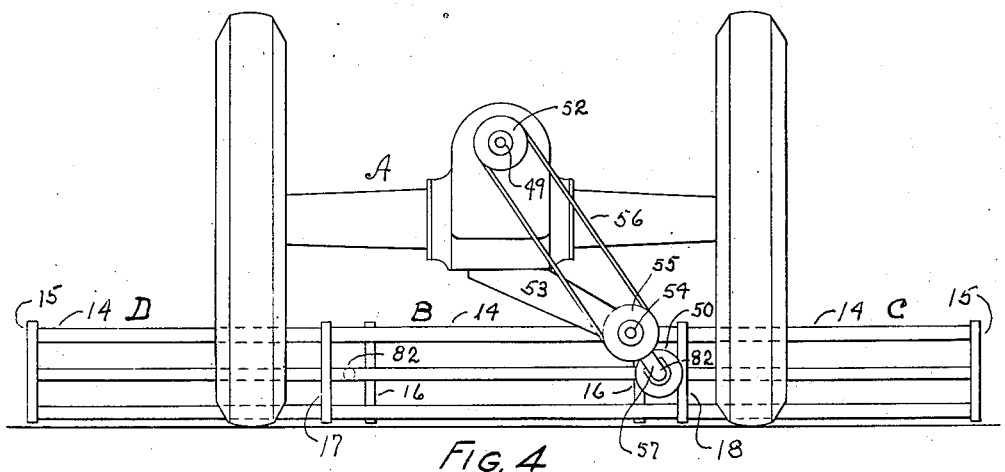
Fig. 4 is a rear fractional diagrammatic drawing of the tractor and mower attachments, illustrating the manner of supplying power from the power take-off to the mower units.

A novel feature of the present invention is the manner of supplying power to the units. All modern tractors are provided with power take-off shafts as at 49 which protrude longitudinally through the rear end of the tractor. I provide means for driving units B, C, and D from this power take-off shaft as follows:

The power take-off shaft is provided with a V-belt pulley 52. A bracket 53 is secured to the tractor, as illustrated in Figures 2 and 4 having rotatably mounted therein a shaft 54, the rear end of this shaft having a V-belt pulley 55. A V-belt 56 forms an operating connection between pulleys 52 and 55.

The forward end of shaft 54 is provided with a universal joint 57 (see dotted lines in Figure 1). A splined shaft 58 forms an operating connection between universal joints 51 and 57. Thus it will be seen that power will be transmitted from the power take-off shaft of the tractor to shaft 42 and that power from this shaft is transmitted to the rotor shaft of unit B by means of chain 44 and that power is transmitted from unit B to units C and D by means of shafts 34. Therefore the rotary cutting cylinders of the mower units will be driven in an efficient manner by the power take-off shaft of the tractor and that each mower unit will be free to move up and down over uneven ground by reason of splined shafts 58 and 34.

I provide means for pulling the units as follows:

On the forward axle, midway its length I secure preferably an I-bolt 60 (see Figures 1 and 2) as indicated by dotted lines. The ends of draw bar 61 diverge from I-bolt 60 as indicated by dotted lines in Figure 2. This draw bar may be made integral as shown or in two parts, each part flexibly secured to member 60 separately. The rear ends of the draw bars are flexibly attached preferably to the inner forward corners of units C and D by means of brackets 62.

In order to definitely space the forward ends of brackets 12, I provide a cross brace 63 which freely embraces bolts 64—64 and being hingedly attached to brackets 12 by these bolts. In order to further brace units C and D, braces 65—65 are secured to bolts 64 and to the outer ends of the units as at 66.

Bolts 64 are free enough in members 63 and 65 so the outer ends of units C and D are free to move up and down relative to their inner ends and I-bolts 20 are adapted to act as hinges between units B and C and D.

Shafts 34 and 58 are sufficiently splined to permit independent vertical movement of each of the mower units. Thus it will be seen that the units are flexibly attached to the forward axle of the tractor and that each unit can travel over uneven ground independently.

I provide means for raising and lowering the mower units as follows:

I rotatably mount sheave pulleys 70—70 and 71 on the tractor frame by means of shaft 69 and brackets 72—72. A toothed ratchet wheel 73 is secured to the sheave members. A lever 74 is rotatably mounted on shaft 69 having a dog 75 which is adapted to engage the teeth on ratchet 73.

Figure 3:
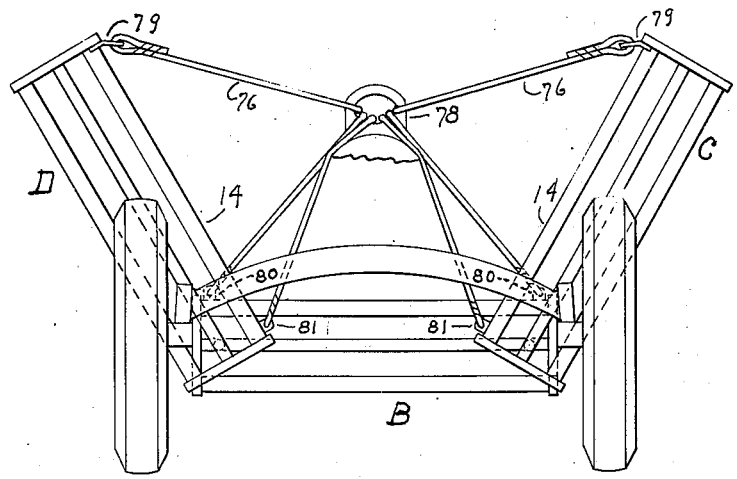
Fig. 3 is a front fractional diagrammatic drawing of the device showing the mower units in their highest position.

The rear ends of cables 76—76 are secured to sheave 70 and cables 77 are each secured to sheaves 71. These cables extend forwardly through an opening or openings in a bracket 78 from whence they extend to the mower units, as illustrated. Cables 76 are secured to the outer ends of units C and D as at 79, as illustrated in Figures 2 and 3.

Two of cables 77 are secured to the outer ends of unit B as at 80 and the other two ends of cables 77 are secured to the inner ends of units C and D, as at 81. Clearly, by moving lever 74 back and forth, the cables will be wound on the sheaves and the operation may be continued long enough to lift the units to the position illustrated in Figure 3. Ratchet means may be provided for lowering the units by means of a back and forth movement of lever 74. Such devices are too well known to require further description.

Referring now to Figure 4. It may be assumed that numeral 82 designates the position of I-bolts 20. Clearly two more units may be added to the assembly and powered similar to that shown and unit B may be positioned in front of units C and D and similar means used to pull, power and lift these units.

Having thus shown and described my invention, I claim:

1. A device of the class described, comprising a tractor having front and rear guiding and driving wheels and a power take-off shaft, three lawn mower units arranged transversely under said tractor and between said guiding and driving wheels, two of said units being in spaced transverse alignment and the other unit being positioned in rear of said two units and adapted to cut the strip straddled by said two units, draw bars flexibly secured to the forward end of the tractor midway its width and diverging rearwardly and being flexibly connected to said two units, an operating connection from said power take-off shaft to said other unit and operating connections from said other unit to said two units, said two units at their inner rear corners having universal joint connections to the adjacent corners of said other unit, carrying rollers on the rear of each said units and carrying wheels secured to the front inner ends of said two units, the front inner ends of said two units being connected together by means of a rigid bar with hinges therebetween whereby said units are free to move over uneven ground.

2. A device as recited in claim 1 including; said operating connections each comprising a shaft having two universal joints and a splined connection.

3. A device as recited in claim 1 including; said first operating connection having a bracket secured to the rear end of the frame of the tractor, a shaft rotatably mounted in said bracket the rear end having an operating connection to said power take-off shaft.

4. A device of the class described, comprising a tractor having guiding and carrying wheels at one end and transversely spaced carrying and driving wheels at the other end and a power take-off shaft, three lawn mower units arranged transversely under said tractor and between said guiding and driving wheels, two of said units being in transverse spaced alignment, the other unit being positioned adjacent said first units and adapted to cut the swath therebetween, draw bars loosely secured to the forward axle midway its length and diverging rearwardly and having flexible connections to said units, an operating connection between said power take-off and said units, operating connections between said other unit and the other ends of said two units, said operating connections each including two universal joints and a splined shaft, carrying wheels secured to the front of said units, universal joints forming a connection between adjacent corners of said units, carrying rollers mounted on the rear of each said units whereby the height of each unit is determined by said carrying wheels and rollers and each unit may move over uneven ground independently.

5. A device of the class described, comprising a tractor having guiding and carrying wheels at one end and transversely spaced carrying and driving wheels at the other end and a power take-off shaft, three lawn mower units arranged transversely under said tractor and between said guiding and driving wheels, two of said units being in transverse spaced alignment, the other unit being positioned in rear of said two units and adapted to cut the swath left by said two units, draw bars flexibly secured to the forward axle midway its length and diverging rearwardly and having a flexible connection to the forward inner corners of said two units, an operating connection between said power take-off and said other unit, operating connections between the ends of said other unit and the outer ends of said two units, said operating connections each having two universal joints and a splined shaft, a universal joint connection between the inner rear corners of said two units and the adjacent corners of said other unit, a hinged spacer between the front ends of said two units whereby said two units are hinged to each other and to said other unit longitudinally of the tractor.

6. A device of the class described, comprising a tractor having front and rear guiding and driving wheels and a power take-off shaft, three lawn mower units arranged transversely under said tractor and between said guiding and driving wheels, two of said units being spaced in transverse alignment and the other unit being positioned to cut the strip straddled by said two units, draw bar connections to said units and an operating connection between said power take-off shaft and one of said units and operating connections between said units, said first two units being hingedly connected together by means of a spacer bar and being flexibly connected at their inner corners to the adjacent corners of said other unit, a sheave rotatably mounted on the frame of said tractor, six cables having anchoring means each being operatively engaged at one end by said sheave, two of said cables at the other ends being secured in spaced relation to said units at one side of said tractor and two other cables being secured in spaced relation to said units on the other side of the tractor, two of said cables being operatively connected to the outer ends of said two units, manually controlled means for operating said sheave to wind the cables thereon, whereby said units may be simultaneously raised and lowered.

7. A device of the class described, comprising a tractor having guiding and carrying wheels at one end and transversely spaced carrying and driving wheels at the other end and a power take-off shaft, three lawn mower units arranged transversely under said tractor and between said guiding and driving wheels, two of said units being spaced in transverse alignment, the other unit being positioned to cut the strip between said first two units, said two units at their fronts being hingedly held in transverse spaced position by means of a connecting bar, universal joints between the inner corners of said two units and the adjacent corners of said other unit, flexible draw bar connections between said tractor and said two units, operating connections between said power take-off and said other unit and operating connections between said other unit and said two units, sheaves of different diameters rotatably mounted on the frame of the tractor and having operating means, the larger sheave or sheaves being secured to two cables and the other sheave or sheaves being secured to four cables, said two cables being secured to the outer ends of said two units, two of said four cables being secured in longitudinal spaced relation to said three units on one side of the tractor and the other two cables being secured in longitudinal spaced relation to said three units on the other side of the tractor whereby when said sheaves are operated to receive the cables, the outer ends of said two units will be lifted faster than their inner ends and said other unit.

8. A device of the class described, comprising two front units and a third unit, said front units being spaced transverse to the direction of travel, the third unit being positioned in rear of the front units and adapted to pass over the space between the front units, the front inner ends of said front units being connected together by means of a rigid spacer with hinges therebetween, flexible joints forming connections between the inner rear ends of said front units and the front outer ends of said third unit, each said units having rear carrying means, castered carrying wheels secured to the front of the front units adjacent their connection to said rigid bar, hitch bars flexibly secured to the front of said front units and converging forwardly forming a guiding and pulling connection for the device.

9. A device of the class described, comprising two front units and a third unit, said front units being spaced transverse to the direction of travel and the third unit being positioned in rear of the front units and adapted to pass over the space between the front units, upwardly and forwardly extending brackets secured to the inner front corners of said front units, castered carrying wheels mounted on the front ends of said brackets, the front ends of said brackets being secured together by means of a rigid bar with hinges therebetween, braces attached to the outer ends of said front units and to the forward ends of said brackets, universal joint connections between the rear inner ends of said front units and the front outer ends of said third unit, each said units having rear carrying rollers, hitch bars flexibly connected to the inner ends of said front units and converging forwardly terminating into a guiding and pulling connection for the device.

10. In a multiple unit lawn mower and means for pulling and driving the same, two units spaced transverse to the direction of travel and a third unit positioned adjacent the two units and adapted to cut the space straddled by the two units, roller supporting means attached to the rear of each said units, the adjacent corners of said three units being connected together by means of universal joints, wheel carrying means attached to the front of said units, the ends of said two units on the opposite sides from said universal joints having a spacing bar and hinged joints therebetween whereby said three units are free to travel over uneven ground.

WILLIAM F. KRENZKE.